(12) United States Patent
DelGaudio et al.

(10) Patent No.: US 7,640,312 B2
(45) Date of Patent: Dec. 29, 2009

(54) METHOD, SYSTEM, AND PROGRAM PRODUCT FOR MANAGING COMMUNICATIONS PURSUANT TO AN INFORMATION TECHNOLOGY (IT) MIGRATION

(75) Inventors: Carol I. DelGaudio, Williston, VT (US); Scott D. Hicks, Underhill Center, VT (US); William M. Houston, Danbury, CT (US); Victoria A. Locke, Newburgh, NY (US); Douglas G. Murray, Johnson City, NY (US); Jeffrey E. Prince, Bloomfield Hills, MI (US); Diane C. Rauch, Sunset Beach, NC (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/464,903

(22) Filed: Aug. 16, 2006

(65) Prior Publication Data
US 2007/0078937 A1  Apr. 5, 2007

Related U.S. Application Data

(63) Continuation-in-part of application No. 11/096,002, filed on Mar. 31, 2005.

(51) Int. Cl.
G06F 15/16 (2006.01)
(52) U.S. Cl. .................. 709/206; 709/204; 709/207; 707/101; 707/102; 705/26; 705/28; 705/14
(58) Field of Classification Search .................. 709/206
See application file for complete search history.

(56) References Cited

U.S. PATENT DOCUMENTS 5,208,748 A    5/1993  Flores et al.
5,754,939 A    5/1998  Herz et al.
5,918,158 A *  6/1999  LaPorta et al. ............. 340/7.29
6,088,722 A    7/2000  Herz et al.

(Continued)

OTHER PUBLICATIONS

Robert S. Brewer, "Improving Problem-Oriented Mailing List Archives with MCS", Collaborative Software Development Laboratory, Department of Information and Computer Sciences, University of Hawaii, Manoa, Honolulu, Hawaii, 96822 USA, pp. 95-104.

(Continued)

*Primary Examiner*—Firmin Backer
*Assistant Examiner*—Natisha Cox
(74) *Attorney, Agent, or Firm*—William Schesser; Hoffman Warnick LLC

(57) ABSTRACT

Under the present invention, an initial distribution list of electronic message recipients within an organization undergoing an IT migration is generated using a personnel directory of the organization and at least one selection criterion. Once initial electronic message recipients are known, messages will be generated and sent using information from a mailing database and a designated schedule. User records for each of the initial electronic message recipients will be created in an inventory database and will include user information from the personnel directory as well as message information. Based on responses to the initial electronic message, follow-up and final electronic messages can be sent to respective distribution lists, and corresponding information stored in the user records of the inventory database.

26 Claims, 5 Drawing Sheets

U.S. PATENT DOCUMENTS

| | | |
|---|---|---|
| 6,460,036 B1 | 10/2002 | Herz |
| 6,480,885 B1 | 11/2002 | Olivier |
| 6,496,977 B1 | 12/2002 | Hamilton, II et al. |
| 6,856,240 B1* | 2/2005 | Elswick et al. ............. 340/7.22 |
| 7,133,901 B1* | 11/2006 | Dalby et al. ................ 709/206 |
| 7,225,195 B2* | 5/2007 | Avrahami et al. ........... 707/101 |
| 2002/0069213 A1 | 6/2002 | Moslander et al. |
| 2002/0087404 A1* | 7/2002 | Silkey et al. .................. 705/14 |
| 2002/0099633 A1 | 7/2002 | Bray |
| 2003/0167354 A1 | 9/2003 | Peppers et al. |
| 2003/0185379 A1 | 10/2003 | O'Connor et al. |
| 2004/0034577 A1* | 2/2004 | Van Hoose et al. ............ 705/28 |
| 2004/0153512 A1 | 8/2004 | Friend |
| 2005/0125544 A1* | 6/2005 | Zhao .......................... 709/227 |
| 2006/0294561 A1* | 12/2006 | Grannan et al. ............. 725/101 |
| 2008/0288589 A1* | 11/2008 | Ala-Pietila .................. 709/204 |

OTHER PUBLICATIONS

Sakata et al., "Maiing List System Enabling Consummatory Communication", vol. 41, Issue 10, Oct. 2000, pp. 2762-2769.

Tsukamoto et al., "Design and Implementation of a Mail Distribution System Using Reasoning Mechanism for Dynamic Group Construction", vol. 11, Issue 5, Sep. 1996, pp. 735-743.

* cited by examiner

| Direct Mail Process Information Update
(IMPORTANT: information entered will be used to update ALL selected documents. Fields left blank. will not be used as part of the update.) ||| Ok |
|---|---|---|---|
| Adapter installed by DSR? | ○ Yes - User will visit facility for DSR install
○ No - Adapter will be mailed to user.
⊙ N/A - Adapter not required || Cancel |
| Requisition Number | ⌐ ⌐ |||
| Requisition created on | [16] |||
| Purchase order number | ⌐ ⌐ |||
| Purchase order created on | [16] |||
| Send notification? | ⊙ Do not send any notes at this time
○ Send note for mailing a cable only
○ Send note for no adapter or cable will be mailed |||

FIG. 5

METHOD, SYSTEM, AND PROGRAM PRODUCT FOR MANAGING COMMUNICATIONS PURSUANT TO AN INFORMATION TECHNOLOGY (IT) MIGRATION

CROSS-REFERENCE TO RELATED APPLICATIONS

The present application is a Continuation-in-Part (CIP) application of the commonly owned co-pending application identified by application Ser. No. 11/096,002, filed Mar. 31, 2005 and entitled "System, Method and Program Product for Managing Communications Pursuant to an Information Technology (IT) Migration," herein incorporated by reference. The present invention is related in some aspect to the commonly owned co-pending application identified by application Ser. No. 11/215,755, filed Aug. 30, 2005 and entitled "Method, System and Program Product for Performing an Integrated IT Migration and Inventory Information Collection," herein incorporated by reference. The present invention is also related in some aspect to the commonly owned co-pending application identified by application Ser. No. 10/728,520, filed Dec. 4, 2003 and entitled "Method and System for Enterprise-Wide Migration," herein incorporated by reference. The present invention is also related in some aspect to the commonly owned co-pending application identified by application Ser. No. 11,186,211, filed Jul., 21 2005 and entitled "Method and System for Enterprise-Wide Migration," herein incorporated by reference.

FIELD OF THE INVENTION

In general, the present invention relates to communications management. Specifically, the present invention relates to a system, method and program product for managing communications pursuant to an Information Technology (IT) migration.

BACKGROUND OF THE INVENTION

As Information Technology (IT) continues to advance, many organizations are faced with the task of migrating their existing computer infrastructures, telephone systems and the like to newer technology. For example, an organization might wish to migrate its networking functions from token ring to Ethernet. Similarly, an organization might wish to migrate its telephone service from a landline-based service to a voice-over-IP service. To accomplish the desired migration, an organization will often hire an outside service-provider that will gather needed information and perform the actual migration.

Unfortunately, performing IT migrations such as these have historically been extremely expensive and labor-intensive processes. Specifically, IT migrations prior to the present invention necessitated numerous physical visits, telephone calls, and many manual processes for announcements, gathering of information and scheduling the actual migration. Unfortunately, this approach has several problems. For example, distribution lists currently must be generated manually. Moreover, a variation in individual's schedules typically creates problems in gathering the needed information, and often requires several physical visits. In addition, the actual migration is usually delayed since performing the migration typically requires that representatives of the organization be present while the service provider is on site. Still yet, there is no existing system that can manage the communications between the service provider and the organization.

In view of the foregoing, there exists a need for a solution that overcomes the above-mentioned deficiencies in the related art.

SUMMARY OF THE INVENTION

In general, the present invention provides a method, system, and program product for managing communications pursuant to an IT migration. Specifically, under the present invention, at least one selection criterion for generating an initial distribution list of electronic message recipients will be designated. The at least one selection criterion will typically be provided via a graphical user interface and can include a criterion such as work location, building number, building floor and workplace indicator (mobile employee, work-at-home employee, etc.). Once provided, the at least one selection criterion can be used to generate the initial distribution list. Specifically, the at least one selection criterion will be compared to personnel records contained in a (personnel) directory to identify an initial set of electronic message recipients. Thereafter, a user record will be created in a first database (e.g., an inventory database) for each of the initial set of electronic message recipients based on information contained in the personnel records. Then, an initial electronic message can be sent from a second database (e.g., mailing database) to the initial set of electronic message recipients according to a mailing schedule. The electronic message will typically be sent using electronic (email) addresses obtained from the user records of the inventory database.

In addition, a follow-up distribution list containing a follow-up set of electronic message recipients will be generated based on responses to the initial electronic message and the mailing schedule. This allows a follow-up electronic message to be sent. In a typical embodiment, the initial electronic message and the follow-up electronic message include a utility for inventorying computer systems of the electronic message recipients. In addition, under the present invention, the follow-up electronic message is selected from the mailing database using a decision tree process that can be based on, among other things, the responses to the initial electronic message.

Still yet, a final distribution list containing a final set of electronic message recipients can be generated based on responses received to the initial electronic message, the follow-up electronic message and the mailing schedule. Thereafter, a final electronic message can be sent from the mailing database. In general, the final electronic message indicates that responses will no longer be accepted, or sets forth a date after which responses will no longer be accepted.

A first aspect of the present invention provides a method for managing communications pursuant to an Information Technology (IT) migration, comprising: obtaining a mailing schedule for sending electronic messages for the IT migration; obtaining at least one selection criterion for generating an initial distribution list; comparing the at least one selection criterion to personnel records contained in a directory to identify an initial set of electronic message recipients for the initial distribution list; creating a user record in a first database for each of the initial set of electronic message recipients based on the personnel records; and sending an initial electronic message from a second database to the initial set of electronic message recipients according to the mailing schedule using electronic addresses obtained from the user records of the first database.

A second aspect of the present invention provides a method for managing communications pursuant to an Information Technology (IT) migration, comprising: specifying at least one selection criterion from the group consisting of work location, building number, building floor and workplace indicator; selecting a plurality of personnel records from a directory based upon the at least one selection criterion; defining a user record in a first database for each of the plurality of personnel records selected from the directory; and generating an initial distribution list by obtaining an electronic address from each user record in the first database.

A third aspect of the present invention provides a system for managing communications pursuant to an Information Technology (IT) migration, comprising: a schedule system for obtaining a mailing schedule for sending electronic messages for the IT migration; a criterion system for obtaining at least one selection criterion for generating an initial distribution list; a distribution list system for comparing the at least one selection criterion to personnel records contained in a directory to identify an initial set of electronic message recipients for the initial distribution list; a record creation system for creating a user record in a first database for each of the initial set of electronic message recipients based on the personnel records; and a message system for sending an initial electronic message from a second database to the initial set of electronic message recipients according to the mailing schedule using electronic addresses obtained from the user records of the first database.

A fourth aspect of the present invention provides a program product stored on a computer useable medium for managing communications pursuant to an Information Technology (IT) migration, the computer useable medium comprising program code for performing the following steps: obtaining a mailing schedule for sending electronic messages for the IT migration; obtaining at least one selection criterion for generating an initial distribution list; comparing the at least one selection criterion to personnel records contained in a directory to identify an initial set of electronic message recipients for the initial distribution list; creating a user record in a first database for each of the initial set of electronic message recipients based on the personnel records; and sending an initial electronic message from a second database to the initial set of electronic message recipients according to the mailing schedule using electronic addresses obtained from the user records of the first database.

A fifth aspect of the present invention provides a method for deploying an application for managing communications pursuant to an Information Technology (IT) migration, comprising: providing a computer infrastructure being operable to: obtain a mailing schedule for sending electronic messages for the IT migration; obtain at least one selection criterion for generating an initial distribution list; compare the at least one selection criterion to personnel records contained in a directory to identify an initial set of electronic message recipients for the initial distribution list; create a user record in a first database for each of the initial set of electronic message recipients based on the personnel records; and send an initial electronic message from a second database to the initial set of electronic message recipients according to the mailing schedule using electronic addresses obtained from the user records of the first database.

A sixth aspect of the present invention provides computer software embodied in a computer useable medium for managing communications pursuant to an Information Technology (IT) migration, the computer software comprising instructions for performing the following steps: obtaining a mailing schedule for sending electronic messages for the IT migration; obtaining at least one selection criterion for generating an initial distribution list; comparing the at least one selection criterion to personnel records contained in a directory to identify an initial set of electronic message recipients for the initial distribution list; creating a user record in a first database for each of the initial set of electronic message recipients based on the personnel records; and sending an initial electronic message from a second database to the initial set of electronic message recipients according to the mailing schedule using electronic addresses obtained from the user records of the first database.

A seventh aspect of the present invention provides a business method for managing communications pursuant to an IT migration.

Therefore, the present invention provides a method, system, and program product for managing communication pursuant to an IT migration.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a view of a user record created according to the present invention.

FIG. 5 illustrates a graphical user interface for sending electronic messages according to the present invention.

Figure 1:
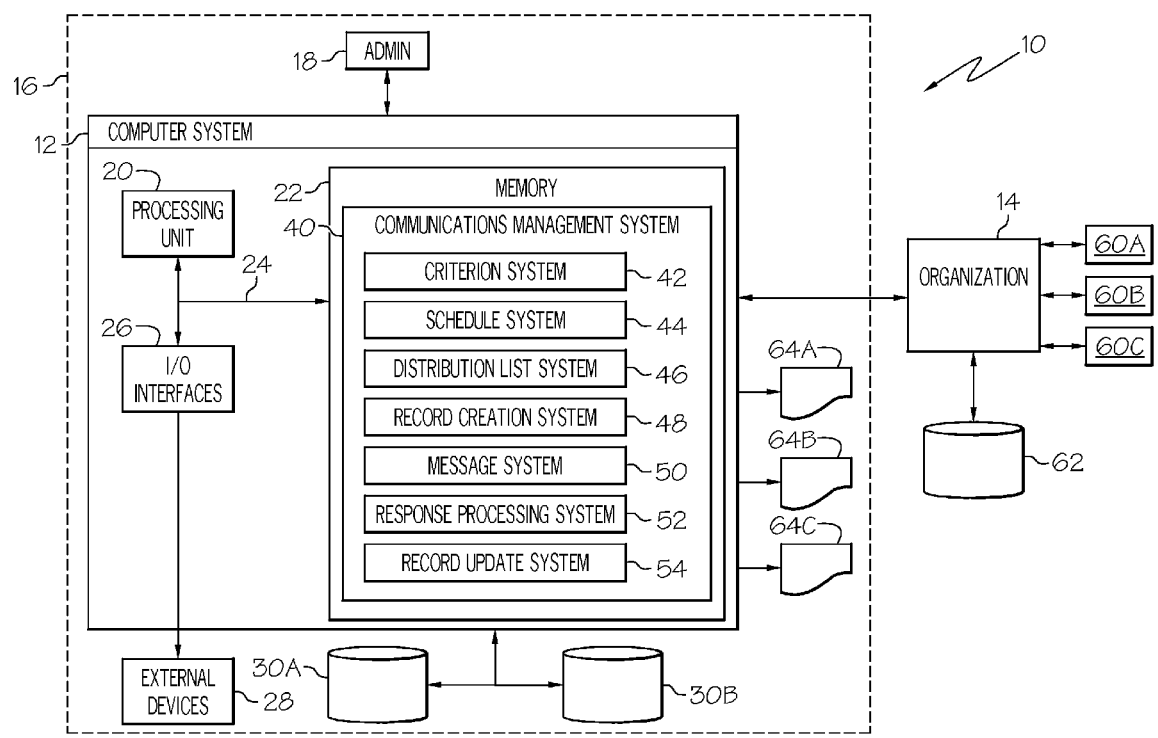
FIG. 1 depicts a system for managing communications pursuant to an IT migration according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for managing communications such as pursuant to an IT migration. Specifically, under the present invention, at least one selection criterion for generating an initial distribution list of electronic message recipients will be designated. The at least one selection criterion will typically be provided via a graphical user interface and can include item(s) such as work location, building number, building floor and workplace indicator (mobile employee, work-at-home employee, etc.). Once provided, the at least one selection criterion can be used to generate the initial distribution list. Specifically, the at least one selection criterion will be compared to personnel records contained in a (personnel) directory to identify an initial set of electronic message recipients. Thereafter, a user record will be created in a first database (e.g., an inventory database) for each of the initial set of electronic message recipients based on information contained in the personnel records. Then, an initial electronic message can be sent from a second database (e.g., mailing database) to the initial set of electronic message recipients according to a mailing schedule. The electronic message will typically be sent using electronic (email) addresses obtained from the user records of the inventory database.

In addition, a follow-up distribution list containing a follow-up set of electronic message recipients will be generated based on responses to the initial electronic message and the mailing schedule. This allows a follow-up electronic message to be sent. In a typical embodiment, the initial electronic message and the follow-up electronic message include a utility for inventorying computer systems of the electronic message recipients. In addition, under the present invention, the follow-up electronic message is selected from the mailing database using a decision tree process that can be based on, among other things, the responses to the initial electronic message.

Still yet, a final distribution list containing a final set of electronic message recipients can be generated based on responses received to the initial electronic message, the follow-up electronic message and the mailing schedule. Thereafter, a final electronic message can be sent from the mailing database. In general, the final electronic message indicates that responses will no longer be accepted, or sets forth a date after which responses will no longer be accepted.

Referring now to FIG. 1, a system 10 for managing communications according to the present invention is shown. As depicted, system 10 includes computer system 12, which is in communication with organization 14. Computer system 12 is intended to represent any type of computer system capable of carrying out the teachings of the present invention. For example, computer system 12 could be a laptop computer, a desktop computer, a workstation, a handheld device, etc. In addition, as will be further described below, computer system 12 can be deployed and/or operated by a service provider such as one that is performing the IT migration for organization 14, or that is managing communications that occur pursuant to the IT migration. As such, computer system 12 is shown deployed within a computer infrastructure 16. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

Organization 14 is intended to represent any type of individual, group of individuals, company, etc. that is experiencing an IT migration. Examples of IT migrations include, among others, migration of networking functions from token ring to Ethernet, migration of telephone service from landline-based service to voice-over-IP service, etc. As further depicted, organization 14 can contain or communicate with one or more personnel directories 62 for organization 14 such as an employee directory, an electronic mail directory, a telephone switch/directory, an electronic company directory, etc. As will be further described below in the illustrative example, personnel directory 62 will be manipulated under the present invention to generate distribution list(s) of electronic message recipients.

In any event, under the present invention, the communications occurring between computer system 12 and organization 14 will be managed using communications management system 40, which is shown implemented on computer system 12 as computer program code. To this extent, computer system 12 is shown including a processing unit 20, a memory 22, a bus 24, and input/output (I/O) interface 26. Further, computer system 12 is shown in communication with external I/O devices/resources 28 and one or more storage systems 30A-B. In general, processing unit 20 executes computer program code, such as communications management system 40, which is stored in memory 22 and/or storage system(s) 30A-B. While executing computer program code, processing unit 20 can read and/or write data, to/from memory 22, storage system(s) 30A-B, and/or I/O interfaces 26. Bus 24 provides a communication link between each of the components in computer system 12. I/O devices 28 can comprise any devices (e.g., keyboard, pointing device, display, etc.) that enable a user to interact with computer system 12 and/or any devices (e.g., network card, modem, etc.) that enable computer system 12 to communicate with one or more other computing devices, such as those in organization 14.

Communications between computer system 12 and organization 14 can occur over one or more networks. Such a network can comprise any combination of various types of communications links. For example, the network can comprise addressable connections that may utilize any combination of wired and/or wireless transmission methods. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer system 12 is only representative of various possible computer infrastructures that can include numerous combinations of hardware. For example, processing unit 20 may comprise a single processing unit, or be distributed across one or more processing units in one or more locations, e.g., on a client and server. Similarly, memory 22 and/or storage systems 30A-B can comprise any combination of various types of data storage and/or transmission media that reside at one or more physical locations. Further, I/O interfaces 26 can comprise any system for exchanging information with one or more I/O devices 28. Still further, it is understood that one or more additional components (e.g., system software, math co-processing unit, etc.) not shown in FIG. 1 can be included in computer system 12. However, if computer system 12 comprises a handheld device or the like, it is understood that one or more I/O devices 28 (e.g., a display) and/or storage system(s) 30A-B could be contained within computer system 12, not externally as shown.

As will be further described below, storage system(s) 30A-B can be any type of systems (e.g., databases) capable of providing storage for information (e.g., message configuration details, message templates, distribution lists, message response statuses, etc.) under the present invention. In a typical embodiment, at least two types of databases that are linked to one another are provided, namely, an inventory database 30A and a mailing database 30B. Inventory database 30A will include or be made to include user records for each user in organization 14 undergoing the IT migration. Such records can include personnel information, message information, IT inventory information, etc. The mailing database 30B will include or be made to include message templates for sending electronic messages.

In any event, storage system(s) 30A-B could each include one or more storage devices, such as a magnetic disk drive or an optical disk drive. In another embodiment, storage system(s) 30A-B include data distributed across, for example, a local area network (LAN), wide area network (WAN) or a storage area network (SAN) (not shown). Although not shown, additional components, such as cache memory, communication systems, system software, etc., may be incorporated into computer system 12. Moreover, although not shown for brevity purposes, computer systems existing within organization 14 will likely contain computerized components similar to computer system 12.

Shown in memory 22 of computer system 12 is communications management system 40, which includes criterion system 42, schedule system 44, distribution list system 46, record creation system 48, message system 50, response processing system 52 and record update system 54. Operation of each of these systems is discussed further below. However, it is understood that some of the various systems shown in FIG. 1 can be implemented independently, combined, and/or stored in memory for one or more separate computer systems 12 that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems.

Figure 2:
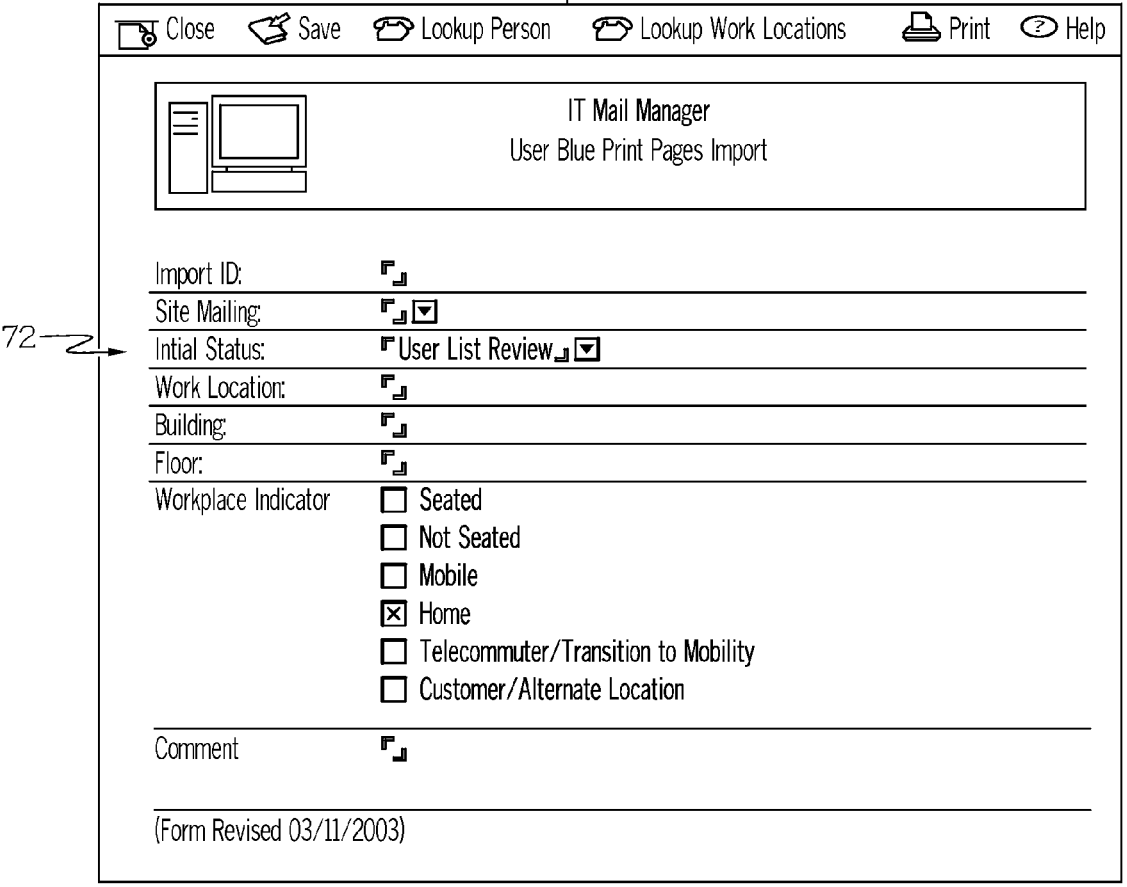
FIG. 2 depicts a graphical user interface for providing at least one selection criterion according to the present invention.

In an illustrative example, assume that organization 14 desires to migrate its networking functions from token ring to Ethernet on an enterprise-wide level. Under the present invention, an initial distribution list 64A of electronic message recipients 60A will be generated. This typically occurs by providing one or more selection criterion via criterion system 42. Specifically, criterion system 42 provides a graphical user interface (GUI) 70, which is shown in FIG. 2. As depicted, GUI 70 provides mechanisms 72 (e.g., fields, drop-down menus, etc.) to allow an administrator 18 (FIG. 1) or the like to select/designate various criteria for selecting users for the IT migration. Such criteria can include one or more of the following: user work location, user building number, user building floor, user workplace indicator such as a mobile employee, work-at-home employee, LAN Attached (seated) employee, etc. As will be further described below, this information will be used to interrogate personnel directory 62 (FIG. 1) to create/generate initial distribution list 64A of electronic message recipients 60A.

Figure 3:
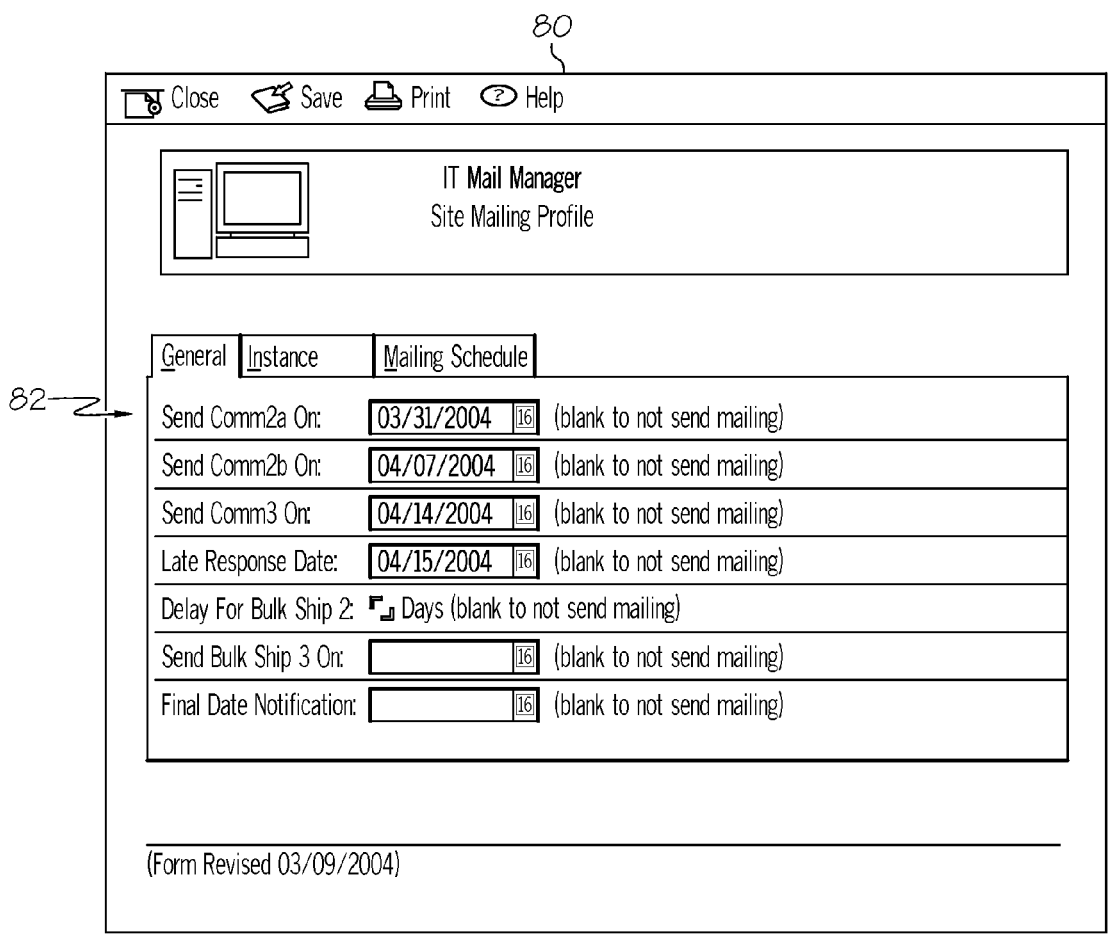
FIG. 3 depicts a graphical user interface for providing a mailing schedule according to the present invention.

Referring back to FIG. 1, communications management system 40 further includes a schedule system 44 for providing a mailing schedule for sending electronic messages for the IT migration. Specifically, referring to FIG. 3, a GUI 80 for providing a mailing schedule according to the present invention is shown (as generated by scheduling system 44). As depicted, GUI 80 includes mechanisms 82 for setting multiple dates for sending electronic messages. Specifically, GUI 80 not only allows dates for sending individual mailings to be set, but it also allows a "late response date" to be set. The "late response date" under the present invention is the date on or after which no responses to electronic message will be accepted. This concept will be further described below.

In any event, referring back to FIG. 1, after a mailing schedule and at least one selection criterion have been provided, distribution list system 46 will generate an initial distribution list 64A of electronic message recipients 60A using the at least one selection criterion and personnel directory 62. Specifically, distribution list system 46 will compare the at least one selection criterion to personnel records contained in personnel directory 62 to identify an initial set (e.g., one or more) of electronic message recipients 60A. To this extent, the initial set of electronic message recipients 60A is identified when a match is established between the at least one selection criterion and user information contained in the personnel records. For example, if the at least one selection criterion designated building Z, floor 3, then any user within organization 14 in building Z on floor 3 would be added to the initial distribution list 64A.

Figure 4:
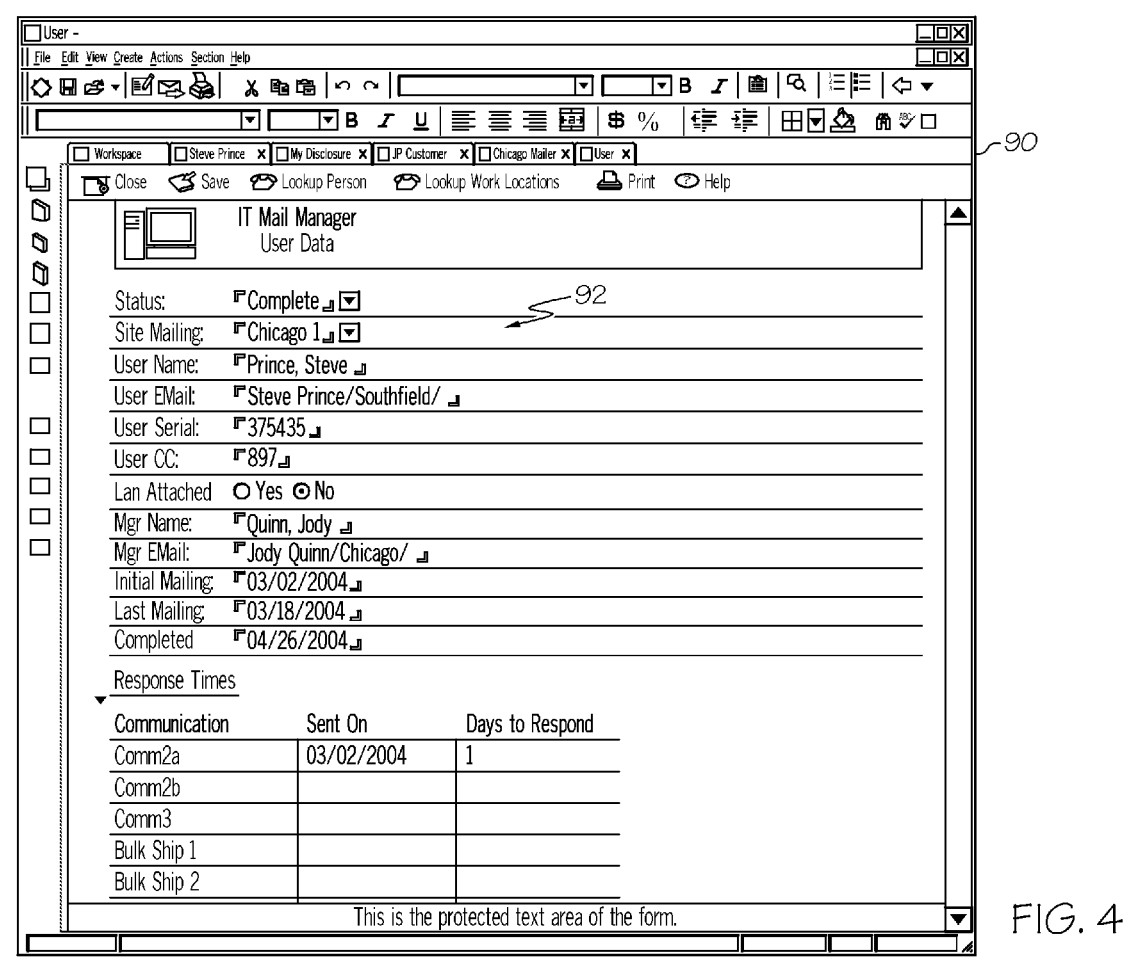

Once the initial distribution list 64A is created, corresponding user records will be created in inventory database 30A by record creation system 48. Specifically, a separate user record will be created for each electronic message recipient 60A in initial distribution list 64A (as identified by distribution list system 46). Initially, each user record will include information obtained from the corresponding personnel records of personnel directory 62. Referring to FIG. 4, an illustrative user record 90 of inventory database 30A is shown. As can be seen various pieces of information 92 have been obtained from the personnel record for message recipient "Steve Prince". Such information can include, among other things, a status, a site mailing address, a user name, a user electronic (mail) address, a user serial number, manager information, etc. In addition, as will be further described below, this information will be added to message information (e.g., date information) as electronic messages are sent.

In any event, referring back to FIG. 1, message system 50 will then send an initial electronic message from mailing database 30B to the initial set of electronic message recipients 60A. Message system 50 will do so according to the mailing schedule and will use electronic (mail) addresses obtained from the user records in inventory database 30A (as created by record creation system 48). In generating the electronic message(s), message system 50 will use templates, stored messages or the like from messaging database 30B. In addition, once the initial electronic message is sent, corresponding message information such as date information, message specifics (e.g., a message identifier and/or or message content details) will be stored in the user records of inventory database 30A by record update system 54. To expedite this process and ensure accuracy, inventory database 30A and mailing database 30B are linked under the present invention.

In general, the initial electronic message as well as a follow-up electronic message (to be described below) includes a utility for inventorying computer systems of the message recipients 60A. When executed, the utility will automatically analyze the computer system of electronic message recipients 60A and obtain any needed IT information (e.g., whether the system has certain hardware and/or software, hardware/software information, etc.). The results obtained by the utility are typically included in responses by the electronic message recipients 60A, which may also include information manually input thereby.

As responses are received from initial set of electronic message recipients 60A they will be received and processed by response processing system 52, which will format the results for presentation to administrator 18 or any other party. In addition, record update system 54 can populate the information contained in the responses into the corresponding user records of inventory database 30A. This information can include, among other things, response message information (e.g., date and time of response), IT information about the recipients' computer systems, responses to questions, etc. Occasionally, responses from certain electronic message recipients 60A are not received and/or additional information is needed. Under the present invention, distribution list system 46 is configured to generate a follow-up distribution list 64B containing a follow-up set of electronic message recipients 60B based on responses (or lack thereof) to the initial electronic message and the mailing schedule. The follow-up distribution list 64B can contain the same or a subset of individuals from initial distribution list 64A, and/or other recipients not included in initial set of electronic message recipients 60A (e.g., equipment suppliers, managers, etc.). To this extent, in a typical embodiment, follow-up set of electronic message recipients 60B are those individuals from whom a response was not received, from whom additional information is required, or to whom information needs to be communicated (e.g., managers, equipment suppliers, etc.). In any event, the follow-up electronic message is sent according to the mailing schedule. For example, referring back to FIG. 3, the initial electronic message is sent on Mar. 31, 2004, and the follow-up electronic message is sent on Apr. 7, 2004.

In a typical embodiment, the follow-up electronic message is generated from mailing database 30B using a decision tree process that is based on the responses to the initial electronic message. For example, if no response was received, a reminder could be sent. Alternatively, if a response was received, a message could be sent based on the information contained therein. For example, referring to FIG. 5, a view 100 of the decision tree process is shown. As depicted, in view 100, a network adapter was not required to perform the IT migration for a particular initial electronic message recipient 60A. This conclusion could have been reached by the utility included with the initial electronic message and received by communications management system 40 in a response. Based on this conclusion, the decision tree processing concluded that a follow-up message was not needed. However, if the adapter had to be installed by "desk side support representative", a certain follow-up message could have been required (e.g., "send note for mailing a cable only"). To this extent, the "decision tree" that is used to generate the follow-up electronic message using templates or the like from mailing database 30B (or select the follow-up electronic message from mailing database 30B) could be stored in memory 22 of computer system 12 or mailing database 30B, and will link procedures to follow (including generating certain follow-up electronic messages) to specific scenarios and/or responses.

Any follow-up electronic messages that are generated will be sent to set of follow-up electronic message recipients 60B. Similar to the initial electronic message, associated message information will be stored in the corresponding user records of inventory database 30A by record update system 54 (as will information from any responses). Based on responses, or lack thereof, distribution list system 46 is further configured to generate a final distribution list 64C containing a final set of electronic message recipients 60C. In a typical embodiment, a final electronic message will be sent to those recipients indicating that responses will no longer be accepted. As such, similar to the initial and follow-up electronic messages, the final electronic message will be generated from the mailing database and sent according to the mailing schedule.

Referring back to FIG. 3, this concept is described in greater detail. Specifically, assume that after failing to respond to the initial electronic message, a reminder follow-up electronic message was sent to electronic message recipient "Z" on Apr. 7, 2004. Further assume that after failing to respond by Apr. 14, 2004, a final electronic message was sent. In one embodiment, the final electronic message could indicate that a response will no longer be accepted from message recipient "Z". In another embodiment, the final electronic message could indicate a different date such as Apr. 15, 2004 as the final response date (shown in FIG. 3 as the "late response date"). In either event, when the final electronic message is sent, associated message information will be stored in the corresponding user records of inventory database 30A by record update system 54. It should be understood that although user records were indicated as being created and maintained in inventory database 30A and mailings derived from mailing database 30B, this need not be the case. For example, both functions could be performed using a single database, more than two databases, or the functions could be swapped between databases 30A-B.

A first method according to the present invention includes determining whether a trigger status for sending an initial set of electronic messages has been reached. Examples of trigger status can include "ready to send", "not ready not send", etc. If the initial set of electronic messages is not ready to send, the process will hold until the trigger status is reached. However, once the appropriate trigger status for sending the initial set of electronic messages message(s) has been reached, it will be determined whether a trigger time for sending the initial set of electronic messages has been reached. Examples of trigger times include certain dates or times at which point the initial set of electronic messages can be sent. If the established trigger time has not been reached, the process will hold until the trigger time is reached. Once this occurs, the initial set of electronic messages will be sent, and the status will be changed (e.g., to message sent). The process can then be repeated for follow-up and final sets of electronic messages.

The present invention also allows for the case where the trigger time has expired. Specifically, first, it is determined whether the trigger status has been reached in a similar fashion as discussed above. If so, it is determined whether the trigger time has expired/is past a deadline. This can occur, for example, if initial, follow-up and/or final electronic messages were not responded to in a timely fashion and/or if the related project (e.g., IT migration) is finalized. If this is the case, the status can be changed (e.g., to past deadline, etc.).

The processing and handling of responses can include determining whether a response to a message has been received. If not, the process will hold. If, however, a response to an electronic message was received, it is determined whether the response has requested removal of a data item or the like (e.g., a land-line telephone number pursuant to an IT migration to voice-over IP telephone service). If so, the status of the response is changed accordingly. If the response did not request removal of a data item, it is determined whether the response requested updating of a data item (e.g., wrong address on record). If so, a details document that contains the data can be updated, and the status can be changed accordingly. If the response did not request updating of a data item, it is determined whether the response specifically requested that the data item be kept. If so, the status is changed accordingly. If not, the status can be changed to a default status.

While shown and described herein as a method and system for managing communications pursuant to an IT migration, it is understood that the invention further provides various alternative embodiments. For example, in one embodiment, the invention provides a computer-readable medium that includes computer program code to enable a computer infrastructure to manage communications. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1)

and/or storage system(s) 30A-B (FIG. 1) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as an Application Service Provider, could offer to manage communications as described above. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for managing communications. In this case, computer infrastructure 16 (FIG. 1) can be provided and one or more systems for performing the process steps of the invention can be obtained (e.g., created, purchased, used, modified, etc.) and deployed to the computer infrastructure 16 (FIG. 1). To this extent, the deployment of a system can comprise one or more of (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure or to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or external I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, although the illustrative example describes a single follow-up message, this need not be the case. Rather, after the initial electronic message, the present invention could be configured and scheduled to send any quantity of follow-up electronic messages.

We claim:

1. A method for managing communications pursuant to an Information Technology (IT) migration, comprising:
    obtaining a mailing schedule for sending a plurality of electronic messages for the IT migration, the mailing schedule including multiple dates, wherein each of the multiple dates is assigned to a type of electronic message in the plurality of electronic messages;
    obtaining at least one selection criterion for generating an initial distribution list;
    comparing the at least one selection criterion to personnel records contained in a directory to identify an initial set of electronic message recipients for the initial distribution list;
    creating a user record in a first database for each of the initial set of electronic message recipients based on the personnel records;
    sending an initial electronic message from a second database to the initial set of electronic message recipients according to the mailing schedule using electronic addresses obtained from the user records of the first database;
    generating a follow-up distribution list containing a follow-up set of electronic message recipients based on responses to the initial electronic message; wherein the follow-up distribution list is distinct from the initial distribution list and can contain other recipients not included in the initial distribution list; and
    sending a follow-up electronic message from the second database to the follow-up set of electronic message recipients according to the mailing schedule, wherein the follow-up electronic message is assigned to a different date of the multiple dates in the mailing list, and wherein the sending of the follow-up electronic message occurs on a different date than the sending of the initial electronic message.

2. The method of claim 1, wherein the initial set of electronic message recipients is identified when a match is established between the at least one selection criterion and user information contained in the personnel records.

3. The method of claim 1, wherein the initial electronic message and the follow-up electronic message include a utility for inventorying computer systems of the initial set of electronic message recipients and the follow-up set of electronic message recipients, and wherein results obtained by the utility are included in the responses.

4. The method of claim 1, wherein the follow-up electronic message is selected from the second database using a decision tree process that is based on the responses to the initial electronic message.

5. The method of claim 1, further comprising:
    generating a final distribution list containing a final set of electronic message recipients based on responses received to the initial electronic message, and the follow-up electronic message; and
    sending a final electronic message from the second database to the final set of electronic message recipients according to the mailing schedule.

6. The method of claim 5, wherein the final electronic message indicates that responses will no longer be accepted.

7. The method of claim 1, further comprising:
    storing message information in the user records of the first database corresponding to the initial electronic message and responses received to the initial electronic message; and
    storing IT information in the user records of the first database based on the responses received to the initial electronic message, wherein the first database is linked to the second database.

8. The method of claim 1, wherein the at least one selection criterion is provided via a graphical user interface, and wherein the at least one selection criterion is selected from the group consisting of work location, building number, building floor, workplace indicator, and combinations thereof 9. A method for managing communications pursuant to an Information Technology (IT) migration, comprising:

obtaining a mailing schedule for sending a plurality of electronic messages for the IT migration, the mailing schedule including multiple dates, wherein each of the multiple dates is assigned to a type of electronic message in the plurality of electronic messages specifying at least one selection criterion from the group consisting of work location, building number, building floor and workplace indicator;

selecting a plurality of personnel records from a directory based upon the at least one selection criterion;

defining a user record in a first database for each of the plurality of personnel records selected from the directory;

generating an initial distribution list by obtaining an electronic address from each user record in the first database;

sending an initial electronic message from a second database to the initial set of electronic message recipients according to the mailing schedule using electronic addresses obtained from the user records of the first database;

generating a follow-up distribution list containing a follow-up set of electronic message recipients based on responses to the initial electronic message; wherein the follow-un distribution list is distinct from the initial distribution list and can contain other recipients not included in the initial distribution list; and sending a follow-up electronic message from the second database to the follow-up set of electronic message recipients according to the mailing schedule, wherein the follow-up electronic message is assigned to a different date of the multiple dates in the mailing list, and wherein the sending of the follow-up electronic message occurs on a different date than the sending of the initial electronic message.

10. A computerized system for managing communications pursuant to an Information Technology (IT) migration, comprising:

at least one computing device including:

a schedule system for obtaining a mailing schedule for sending a plurality of electronic messages for the IT migration, the mailing schedule including multiple dates, wherein each of the multiple dates is assigned to a type of electronic message in the plurality of electronic messages;

a criterion system for obtaining at least one selection criterion for generating an initial distribution list;

a distribution list system for comparing the at least one selection criterion to personnel records contained in a directory to identify an initial set of electronic message recipients for the initial distribution list, wherein the distribution list system generates a follow-up distribution list containing a follow-up set of electronic message recipients based on responses to the initial electronic message; wherein the follow-up distribution list is distinct from the initial distribution list and can contain other recipients not included in the initial distribution list;

a record creation system for creating a user record in a first database for each of the initial set of electronic message recipients based on the personnel records; and a message system for sending an initial electronic message from a second database to the initial set of electronic message recipients according to the mailing schedule using electronic addresses obtained from the user records of the first database, wherein the message system sends a follow-up electronic message from the second database to the follow-up set of electronic message recipients according to the mailing schedule, wherein the follow-up electronic message is assigned to a different date of the multiple dates in the mailing list, and wherein the sending of the follow-up electronic message occurs on a different date than the sending of the initial electronic message.

11. The system of claim 10, wherein the initial set of electronic message recipients is identified when a match is established between the at least one selection criterion and user information contained in the personnel records.

12. The system of claim 10, wherein the initial electronic message and the follow-up electronic message include a utility for inventorying computer systems of the initial set of electronic message recipients and the follow-up set of electronic message recipients, and wherein results obtained by the utility are included in the responses.

13. The system of claim 10, wherein the follow-up electronic message is selected by the message system from the second database using a decision tree process that is based on the responses to the initial electronic message.

14. The system of claim 10, wherein the distribution list system generates a final distribution list containing a final set of electronic message recipients based on responses received to the initial electronic message, and the follow-up electronic message, and wherein the message system sends a final electronic message from the second database to the final set of electronic message recipients according to the mailing schedule.

15. The system of claim 14, wherein the final electronic message indicates that responses will no longer be accepted.

16. The system of claim 10, further comprising an information storage system for storing message information in the user records of the first database corresponding to the initial electronic message and responses received to the initial electronic message, and for storing IT information in the user records of the first database based on the responses received to the initial electronic message, wherein the first database is linked to the second database.

17. The system of claim 10, wherein the at least one selection criterion is provided via a graphical user interface, and wherein the at least one selection criterion is selected from the group consisting of work location, building number, building floor, workplace indicator, and combinations thereof.

18. A program product stored on a computer useable medium for managing communications pursuant to an Information Technology (IT) migration, the computer useable medium comprising program code for performing the following steps:

obtaining a mailing schedule for sending a plurality of electronic messages for the IT migration, the mailing schedule including multiple dates, wherein each of the multiple dates is assigned to a type of electronic message in the plurality of electronic messages;

obtaining at least one selection criterion for generating an initial distribution list;

comparing the at least one selection criterion to personnel records contained in a directory to identify an initial set of electronic message recipients for the initial distribution list;

creating a user record in a first database for each of the initial set of electronic message recipients based on the personnel records;

sending an initial electronic message from a second database to the initial set of electronic message recipients according to the mailing schedule using electronic addresses obtained from the user records of the first database;

generating a follow-up distribution list containing a follow-up set of electronic message recipients based on responses to the initial electronic message; wherein the follow-up distribution list is distinct from the initial distribution list and can contain other recipients not included in the initial distribution list; and sending a follow-up electronic message from the second database to the follow-up set of electronic message recipients according to the mailing schedule, wherein the follow-up electronic message is assigned to a different date of the multiple dates in the mailing list, and wherein the sending of the follow-up electronic message occurs on a different date than the sending of the initial electronic message.

19. The program product of claim 18, wherein the initial set of electronic message recipients is identified when a match is established between the at least one selection criterion and user information contained in the personnel records.

20. The program product of claim 18, wherein the initial electronic message and the follow-up electronic message include a utility for inventorying computer systems of the initial set of electronic message recipients and the follow-up set of electronic message recipients, and wherein results obtained by the utility are included in the responses.

21. The program product of claim 18, wherein the follow-up electronic message is selected from the second database using a decision tree process that is based on the responses to the initial electronic message.

22. The program product of claim 18, wherein the computer useable medium further comprises program code for performing the following steps:

generating a final distribution list containing a final set of electronic message recipients based on responses received to the initial electronic message, and the follow-up electronic message; and sending a final electronic message from the second database to the final set of electronic message recipients according to the mailing schedule.

23. The program product of claim 22, wherein the final electronic message indicates that responses will no longer be accepted.

24. The program product of claim 18, wherein the computer useable medium further comprises program code for performing the following steps:

storing message information in the user records of the first database corresponding to the initial electronic message and responses received to the initial electronic message; and storing IT information in the user records of the first database based on the responses received to the initial electronic message, wherein the first database is linked to the second database.

25. The program product of claim 18, wherein the at least one selection criterion is provided via a graphical user interface, and wherein the at least one selection criterion is selected from the group consisting of work location, building number, building floor, workplace indicator, and combinations thereof.

26. A method for deploying an application for managing communications pursuant to an Information Technology (IT) migration, comprising:

providing a computer infrastructure being operable to:

obtain a mailing schedule for sending a plurality of electronic messages for the IT migration, the mailing schedule including multiple dates, wherein each of the multiple dates is assigned to a type of electronic message in the plurality of electronic messages;

obtain at least one selection criterion for generating an initial distribution list;

compare the at least one selection criterion to personnel records contained in a directory to identify an initial set of electronic message recipients for the initial distribution list;

create a user record in a first database for each of the initial set of electronic message recipients based on the personnel records;

send an initial electronic message from a second database to the initial set of electronic message recipients according to the mailing schedule using electronic addresses obtained from the user records of the first database;

generate a follow-up distribution list containing a follow-up set of electronic message recipients based on responses to the initial electronic message; wherein the follow-up distribution list is distinct from the initial distribution list and can contain other recipients not included in the initial distribution list; and send a follow-up electronic message from the second database to the follow-up set of electronic message recipients according to the mailing schedule, wherein the follow-up electronic message is assigned to a different date of the multiple dates in the mailing list, and wherein the sending of the follow-up electronic message occurs on a different date than the sending of the initial electronic message.

* * * * *